United States Patent
Kim et al.

(10) Patent No.: US 8,522,088 B2
(45) Date of Patent: Aug. 27, 2013

(54) METHOD OF TRANSMITTING DATA BLOCK AND TRANSMITTER USING THE SAME

(75) Inventors: Yun Joo Kim, Suwon-si (KR); Yu Ro Lee, Daejeon-si (KR); Sok Kyu Lee, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/479,170

(22) Filed: May 23, 2012

(65) Prior Publication Data

US 2013/0145224 A1    Jun. 6, 2013

(30) Foreign Application Priority Data

Dec. 6, 2011    (KR) .................. 10-2011-0129359

(51) Int. Cl.
*G06F 11/07*    (2006.01)
*G06F 11/36*    (2006.01)

(52) U.S. Cl.
USPC .......................................... 714/704; 714/748

(58) Field of Classification Search
None
See application file for complete search history.

(56) References Cited

U.S. PATENT DOCUMENTS

| | | | | |
|---|---|---|---|---|
| 4,495,493 | A * | 1/1985 | Segarra et al. | 370/452 |
| 6,563,790 | B1 * | 5/2003 | Yu et al. | 370/230 |
| 2002/0071052 | A1 * | 6/2002 | Itoh et al. | 348/384.1 |
| 2007/0133459 | A1 * | 6/2007 | Kim et al. | 370/329 |
| 2008/0144586 | A1 * | 6/2008 | Kneckt et al. | 370/337 |

FOREIGN PATENT DOCUMENTS

KR    1020050067321 A    7/2005

* cited by examiner

*Primary Examiner* — Ajay Bhatia
*Assistant Examiner* — Dipakkumar Gandhi (57) ABSTRACT

A method for transmitting a data block in a wireless communication system and a transmitter are provided. The transmitter transmits the data block to a receiver and generates a retransmission block for the retransmission of the data block if it is determined that the transmission fails. The transmitter determines whether the channel access is performed according to a transmit time of the retransmission block.

14 Claims, 10 Drawing Sheets

METHOD OF TRANSMITTING DATA BLOCK AND TRANSMITTER USING THE SAME

CROSS-REFERENCE TO RELATED APPLICATIONS

This application claims the benefit of priority of Korean Patent Application No. 10-2011-0129359 filed on Dec. 6, 2011, all of which is incorporated by reference in its entirety herein.

BACKGROUND OF THE INVENTION

1. Field of the Invention

The present invention relates to wireless communication, and more particularly, to a method of transmitting a data block in a wireless communication system, and a transmitter using the same.

2. Related Art

Recently, various wireless communication technologies have been developed with the development of information communication technology. Among them, a wireless local area network (WLAN) is a technique allowing mobile terminals such as personal digital assistants (PDAs), lap top computers, portable multimedia players (PMPs), and the like, to wirelessly access the Internet at homes, in offices, or in a particular service providing area, based on a radio frequency technology.

As a technology specification that has been relatively recently legislated in order to overcome a limitation in a communication speed that has been pointed out as a weak point in the WLAN, there is the IEEE (Institute of Electrical and Electronics Engineering) 802.11n. An object of the IEEE 802.11n is to increase a speed and reliability of a wireless network and extend an operating distance of the wireless network. More specifically, the IEEE 802.11n is based on multiple inputs and multiple outputs (MIMO) technology in which multiple antennas are used at both of a transmitting end and a receiving end in order to support a high throughput (HT) having a maximum data processing speed of 540 Mbps or more, minimize a transmission error, and optimize a data speed.

A basic access mechanism of the IEEE 802.11 medium access control (MAC) is a carrier sense multiple access with collision avoidance (CSMA/CA) mechanism associated with binary exponential backoff. The CSMA/CA mechanism is referred to as a distributed coordination function (DCF) of the IEEE 802.11 MAC and basically adopts a "listen before talk" access mechanism. In this type of access mechanism, a station (STA) listens to a wireless channel or a medium prior to starting transmission. As a result of listening, if it is sensed that the medium is not used, the listening station starts its own transmission. On the other hand, if it is sensed that the medium is used, the station does not start its own transmission and enters a delayed period determined by the binary exponential backoff algorithm.

Recently, the standardization of IEEE 802.11ac that supports a higher data rate has been progressed. A system supporting the IEEE 802.11ac is referred to as a very high throughput (VHT) system. The VHT system supports dynamic bandwidth allocation, SU/MU-MIMO, and link adaptation.

In order to increase reliability of the data transmission, the WLAN system supports retransmission. If the transmission fails, the data are retransmitted. However, the channel may be good and bad in response to the progress of the retransmission. There is a need to perform the retransmission while correctly reflecting the channel status.

SUMMARY OF THE INVENTION

The present invention provides a method for transmitting a data block reflecting a channel status over transmit time of the data block.

Further, the present invention provides a transmitter reflecting a channel status over transmit time of a data block.

In an aspect, a method for transmitting a data block in a wireless communication system includes transmitting the data block to a receiver, determining whether the transmission of the data block fails, generating a retransmission block for the retransmission of the data block if it is determined that the transmission fails, determining whether the channel access is performed according to a transmit time of the retransmission block, performing the channel access if it is determined that the channel access is performed, and transmitting the retransmission block to the receiver after the channel access is performed.

It may be determined that the transmission of the data block fails, if it is determined that the receive acknowledgement for the data block is not received from the receiver.

The performing of the channel access may include transmitting a request to send (RTS) frame to the receiver, and receiving a clear to send (CTS) frame from the receiver.

The transmit time of the data block may be determined according to a transmission rate.

In another aspect, a transmitter configured to transmit a data block in a wireless system includes an RF unit configured to transmit and receive a wireless signal, and a processor, operably connected to the RF unit, configure to instruct the RF unit to transmit the data block to a receiver, determine whether the transmission of the data block fails, generate a retransmission block for the retransmission of the data block if it is determined that the transmission fails, determine whether the channel access is performed according to a transmit time of the retransmission block, perform the channel access if it is determined that the channel access is performed, and instruct the RF unit to transmit the retransmission block to the receiver after the channel access is performed.

In another aspect, a method for transmitting a data block in a wireless communication system includes transmitting a data block to a receiver, determining whether the transmission of the data block fails, and increasing a counter according to a transmit time of the data block if it is determined that the transmission fails.

DESCRIPTION OF EXEMPLARY EMBODIMENTS

Figure 1:
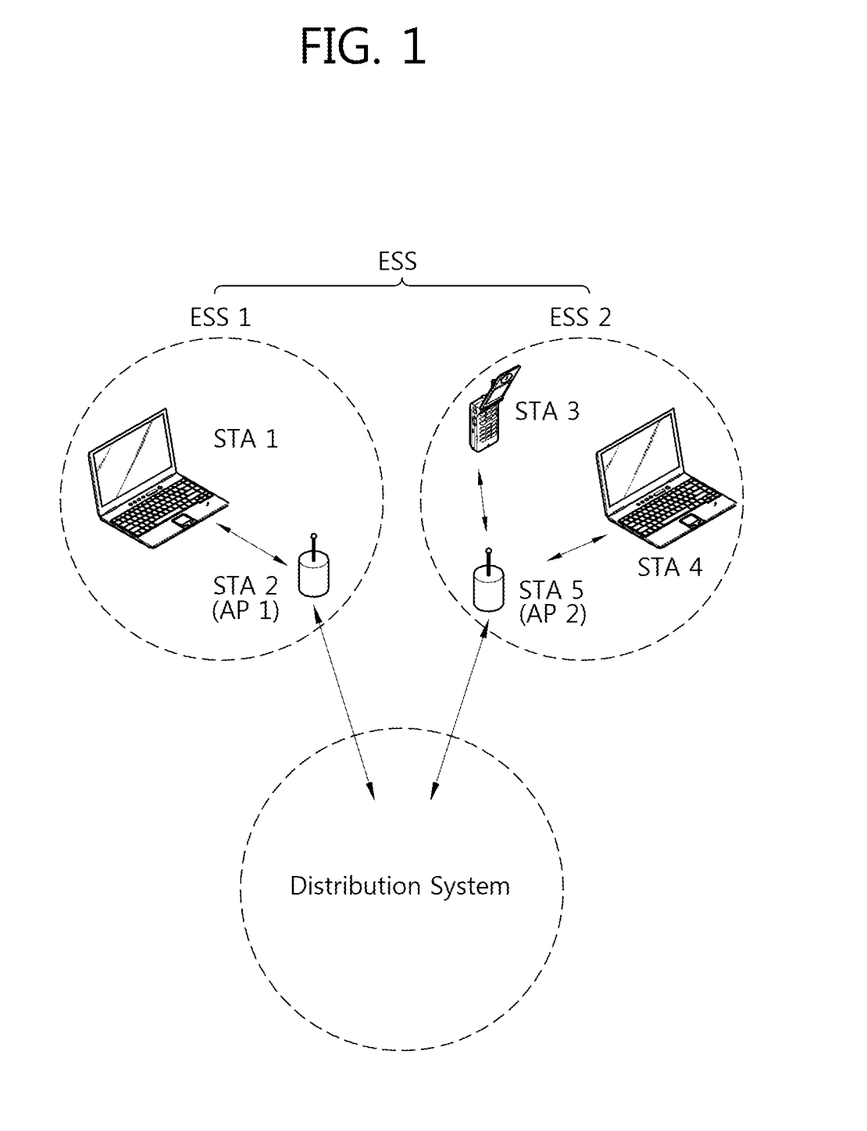
FIG. 1 is a diagram of a configuration of an example of a WLAN system to which an exemplary embodiment of the present invention may be applied.

FIG. 1 is a diagram of a configuration of an example of a WLAN system to which an exemplary embodiment of the present invention may be applied.

A wireless local area network (WLAN) system includes at least one basic service set (BSS). The BSS is a set of stations (STAs) that can be synchronized with one another so as to communicate with one another and is not limited to a concept indicating a specific region.

The WLAN system can use a channel bandwidth of 80 MHz, which is by way of example only. For example, a VHT system may use a channel bandwidth of 20 MHz, 40 MHz, 80 MHz, 160 MHz, or more. As such, the WLAN system has a multi-channel environment in which a plurality of sub-channels having the channel bandwidth of, for example, 20 MHz are present.

The sub-channel may be classified into a primary channel and a secondary channel. The primary channel is designated in the sub-channels and the secondary channel is a non-primary channel.

The BSS may be classified into an infrastructure BSS and an independent BSS (IBSS). FIG. 1 shows the infrastructure BSS. The infrastructure BSS (BSS1 and BSS2) includes at least one STAs (STA1, STA3, and STA4), access points (APs) that are the STAs providing a distribution service, and a distribution system (DS) connecting the plurality of APs (AP1 and AP2) with one another. On the other hand, since the IBSS does not include the AP, all the STAs are configured of a mobile station and an access to the DS is not permitted, such that the IBSS forms a self-contained network.

The STA, that is any functional medium including a medium access control (MAC) layer according to regulations of the IEEE 802.11 standard and a physical layer (PHY layer) interface for a wireless medium, includes both of the AP and the non-AP station as a broad sense.

A mobile terminal operated by a user among the STAs is a non-AP, the STA (STA1, STA3, and STA4) and when being simply referred to as STA, indicates the non-AP STA. The non-AP STA may be referred to as other names such as a terminal, a wireless transmit/receive unit (WTRU), user equipment (UE), a mobile station (MS), a mobile terminal, a mobile subscriber unit, or the like.

The AP (AP1 and AP2) is a functional entity providing the access to the DS via a wireless medium for the station associated therewith. In the infrastructure BSS including the AP, communication among the non-AP STAs is basically performed via the APs, but direct communication among the non-AP STAs can be performed when a direct link is established. The AP may be referred to as a centralized controller, a base station (BS), a node-B, a base transceiver system, a site controller, or the like.

The plurality of infrastructure BSSs may be connected with one another through the distribution system (DS). The plurality of BSSs connected with one another through the DS are referred to as an extended service set (ESS). The STAs included in the ESS may communicate with one another and the non-AP STAs within the same ESS may move from one BSS to another BSS while seamlessly communicating with one another.

The DS is a mechanism for communicating one AP with another AP. By the DS, the AP may transmit the frame to the STAs associated with the BSS managed by the AP or transmits the frame or transmit the frame to an external network such as a wired network, or the like, when any one STA moves to another BSS. The DS is not necessarily a network and a shape thereof is not limited when the DS may provide a predetermined distribution service regulated in the IEEE 802.11. For example, the DS is a wireless network such as a mesh network or may be a physical structure that connects the APs with one another.

Figure 2:
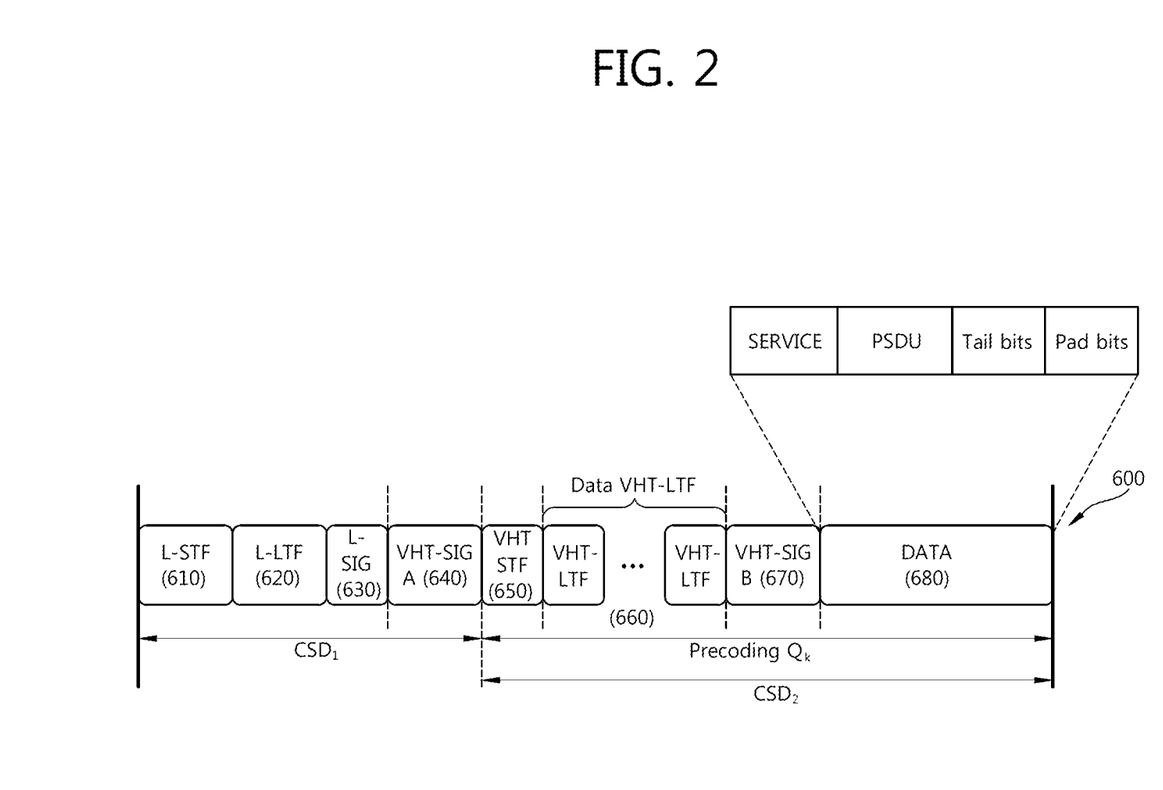
FIG. 2 is a block diagram showing an example of a PPDU format.

FIG. 2 is a block diagram showing an example of a PPDU format.

A PLCP protocol data unit (PPDU) 600 may include a legacy-short training field (L-STF) 610, a legacy-long training field (L-LTF) 620, a legacy-signal (L-SIG) field 630, a very high throughput (VHT)-SIGA field 640, a VHT-STF 650, a VHT-LTF 660, a VHT-SIGB 670, and a data field 680.

The L-STF 610 is used for frame timing acquisition, automatic gain control (AGC), coarse frequency acquisition, or the like.

The L-LTF 620 is used for channel estimation for demodulation of the L-SIG field 630 and the VHT-SIGA field 640.

The L-SIG field 630 includes control information on a transmit time of the PPDU.

The VHT-SIGA field 640 includes common information required for the STAs supporting multiple input multiple output (MIMO) transmission to receive a spatial stream. The VHT-SIGA field 640 includes information on the spatial streams for each STA, channel bandwidth information, a group identifier, information on an STA to which each ground identifier is allocated, a short guard interval (GI), beamforming information (including whether the MIMO is SU-MIMO or MU-MIMO).

The VHT-STF 650 is used to improve performance of AGC estimation in the MIMO transmission.

The VHT-LTF 660 is used for each STA to estimate MIMO channels.

The VHT-SIGB field 670 includes individual control information on each STA. The VHT-SIGB field 670 includes modulation and coding scheme (MCS) information. A size of the VHT-SIGB field 640 may be changed according to a type of MIMO transmission (MU-MIMO or SU-MIMO) and a bandwidth of a channel used for transmitting the PPDU.

The data field 680 includes the physical service data unit (PSDU) transferred from the MAC layer, a service field, tail bits, and padding bits if necessary.

Hereinafter, the exchange between the request to send (RTS) frame and the clear to send (CTS) frame that are a contention based channel access scheme in the WLAN system will be described.

In the distributed coordination function (DCF) using the carrier sense multiple access with collision avoidance (CSMA/CA) mechanism, the STA waits until the wireless medium is changed into idle to perform clear channel assessment (CCA) if the wireless medium is sensed as busy.

A network allocation vector (NAV) uses a network allocation vector (NAV). The NAV is a value allowing the STA using the current medium or having the use authority to indicate to other STAs the remaining time until the medium remains in the available state. Therefore, the value set by the NAV corresponds to a period in which the use of the medium is scheduled by the STA transmitting the corresponding frame.

As the contrary concept of the NAV preventing the frame transmission, there is transmission opportunity (TXOP). The TXOP means the time when the STA has a right to transmit the data frame (or data block).

Figure 3:
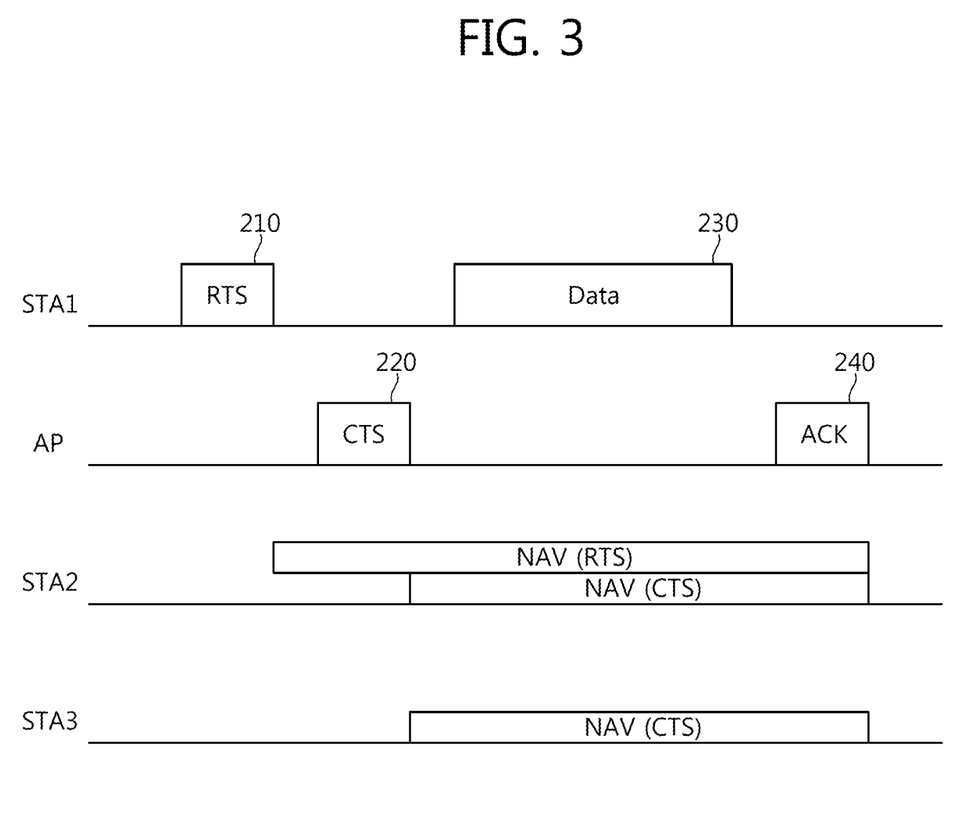
FIG. 3 is a diagram showing an RTS/CTS exchange.

FIG. 3 shows the RTS/CTS exchange procedure.

The STA1 transmits an RTS frame 210 to the AP. The AP transmits a CTS frame 220 as a response to the RTS frame 210. The STA 1 acquiring the TXOP through the CTS frame 220 transmits a data block 230 to the AP. The AP transmits an ACK frame 240 indicating that the data block 230 is successfully received.

The STA2 and the STA3 listens to the RTS frame 210 and/or the CTS frame 220 and sets the NAV.

All the STAs can receive the RTS frame and the CTS frame and the surrounding STAs (for example, STA2 and STA3) sets the NAV to protect the transmission of the STA1 acquiring the TXOP.

The RTS frame and the CTS frame are transmitted for a shorter transmit time than that the data frame Therefore, even though the RTS transmit/receive fails by the collision, the rapid recovery can be implemented. Since the STAs receiving the RTS/CTS frames set all the NAVs, the transmission of the data frame and the ACK frame from a hidden node can be protected.

In order to reduce the overhead for the channel, when duration of the data frame and/or the management frame is longer than a predetermined threshold value (referred to as "RTSThreshold"), the RTS/CTS frame exchange is selectively used. The RTSThreshold may be set to be a value between 0 to 65535 bytes.

The RTSThreshold is a reference determining the use of the RTS/CTS frame exchange and is also used as a reference value for managing the retransmission frequency of the MAC protocol data unit (PDU) (hereinafter, referred to as MPDU). Describing in more detail, the STA manages the retransmission frequency of the MPDU having duration shorter than the RTSThreshold and the MPDU having duration equal to or longer than the RTSThreshold using different counters.

The counter managing the retransmission frequency of the MPDU having the duration shorter than the RTSThreshold is referred to as a short retry counter (SRC) (alternatively, a first transmission counter). The counter managing the retransmission frequency of the MPDU having the duration equal to or longer than the RTSThreshold is referred to as a long retry counter (LRC) (alternatively, a second transmission counter). A retransmission frequency limit value for the SRC is referred to as a short retry limit (SRL) and a retransmission frequency limit value for the LRC is referred to as a long retry limit (LRL).

Each counter again compares the RTSThreshold and thus, is increased to the SRL or the LRL, which affects determining the range of the contention window in which a random value for the channel access is generated. The LRL value recommended in the standard is smaller than the SRL value.

The STA in which the MPDU to be transmitted is present compares the duration of the MPDU with the RTSThreshold prior to the transmission. If it is determined that the duration of the MPDU is equal to or longer than the RTSThreshold, the RTS/CTS frame exchange process starts, including the transmit time of the MPDU and the time required to receive the response to the MPDU in a duration value.

If it is determined that the duration of the MPDU is shorter than the RTSThreshold, the STA immediately transmits the MPDU without exchanging the RTS/CTS frames.

Figure 4:
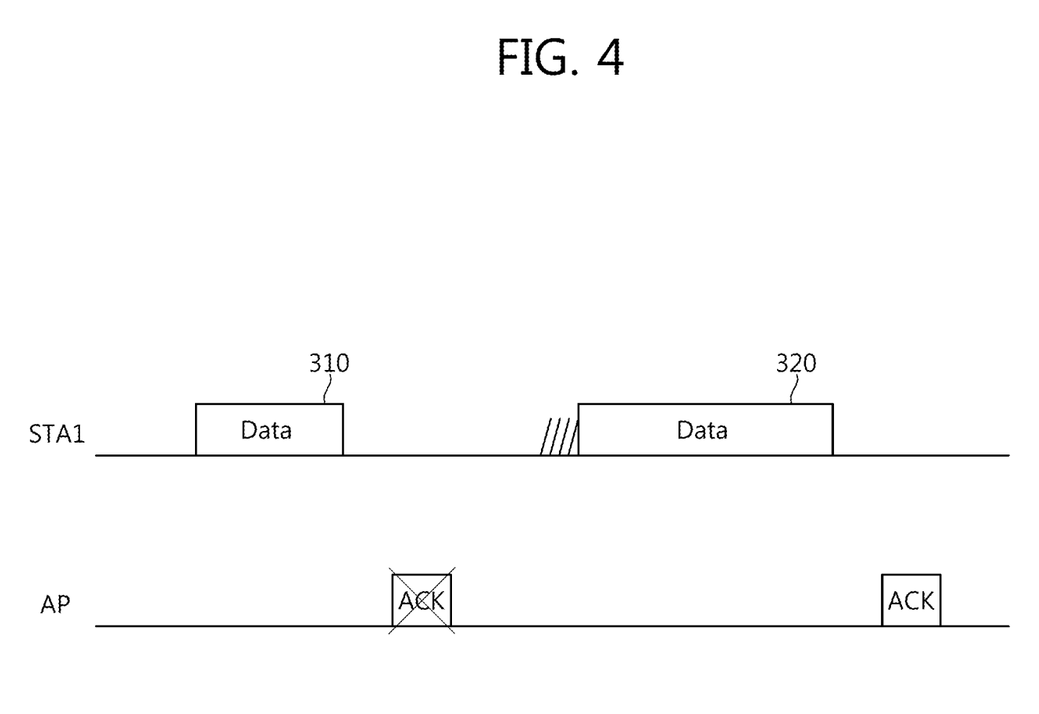
FIG. 4 is a diagram showing data transmission without exchanging the RTS/CTS.

FIG. 4 is a diagram showing the data transmission without exchanging the RTS/CTS.

The STA1 transmits a data frame 310 having the MPDU. It is assumed that the AP does not transmit ACK due to the failure to receive a data frame 310.

The STA1 transmits a retransmission frame 320. In order to increase a transmission success probability of data, the modulation and coding scheme (MCS) having the lower retransmission frame 320 than the data frame 310 may be used. Therefore, the transmit time of the retransmission frame 320 becomes longer than the transmit time of the data frame 310.

As such, when the MPDU having the longer transmit time without exchanging the RTS/CTS frame is transmitted, it may be more affected by the collision than the case of using the RTS/CTS frame exchange.

Figure 5:
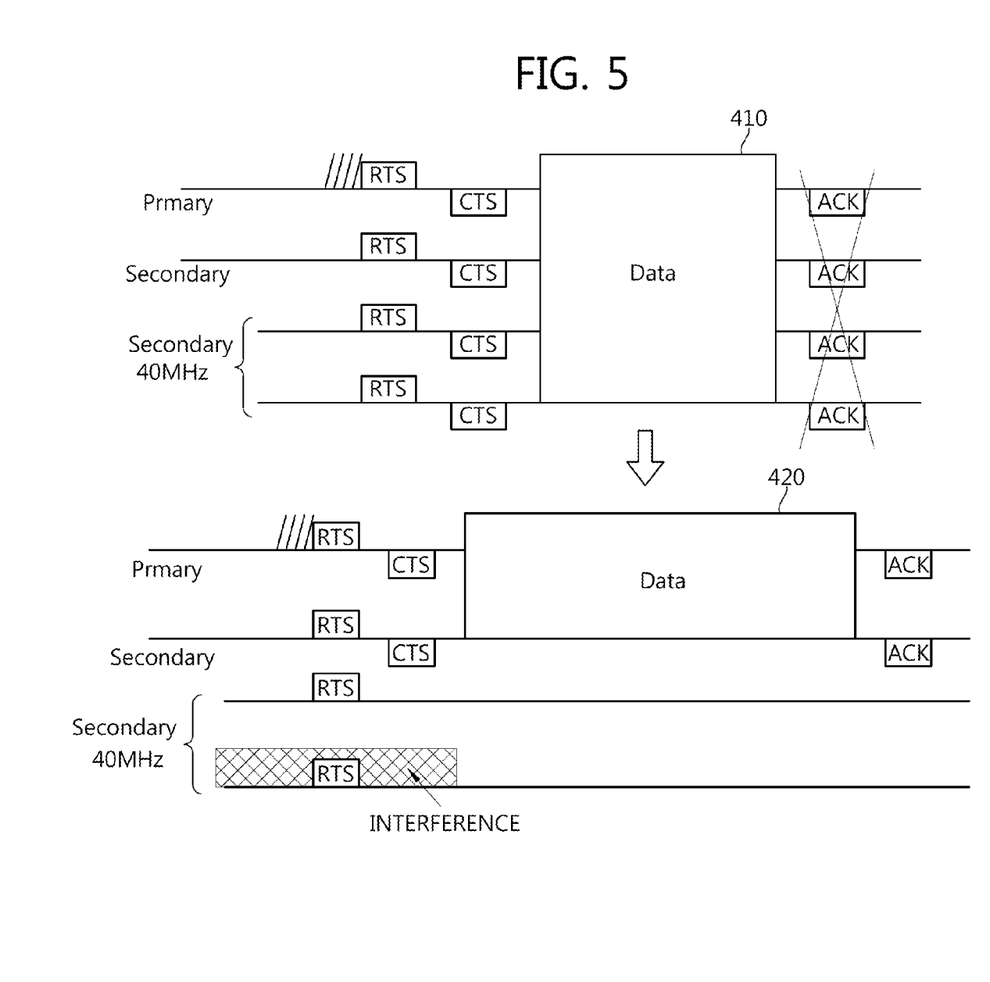
FIG. 5 is a diagram showing an example of transmitting data using a bandwidth of 80 MHz.

FIG. 5 is a diagram showing an example of transmitting data using a bandwidth of 80 MHz.

It is assumed that the bandwidth of 80 MHz is configured of a primary channel having a channel bandwidth of 20 MHz, a first secondary channel having a channel bandwidth of 20 MHz, and a second secondary channel having a channel bandwidth of 40 MHz. The number of sub-channels and the channel bandwidths are by way of example only.

The RTS frame and the CTS frame are transmitted in the sub-channel unit. When the bandwidths of the sub-channels are set to be 20 MHz, four RTS frames are duplicately transmitted in the bandwidth of 80 MHz. Similarly, four CTS frames may be duplicately transmitted in the bandwidth of 80 MHz.

The bandwidth in which the CTS frame is transmitted is equal to or smaller than the bandwidth in which the RTS frame is transmitted. For example, even though the RTS frame is transmitted over the bandwidth of 80 MHz, the CTS frame may be transmitted over the bandwidth of 40 MHz. The STA may use the bandwidth in which the CTS frame is transmitted for the data transmission.

When all the bandwidths of 80 MHz may be used due to the exchange of the RTS frame and the CTS frame, the STA transmits the MPDU 410 using the bandwidths of 80 MHz.

If is determined that transmission of a data frame 410 fails, the STA increases the value of the retransmission counter for the corresponding MPDU to '1' and then, performs the channel access for retransmission. For example, when the duration of the MPDU is smaller than the RTSThreshold, the SRC is increased to 1.

As the backoff result for retransmission, only the bandwidth of 40 MHz can be used due to the interference at the receiver. The transmit time of a retransmission MPDU 420 becomes longer than the initial transmit time of the MPDU 410.

As described above, the transmit time consumed to transmit the MPDU is changed according to the wireless environment at the time when the transmission is determined. However, the existing WLAN system increases the SRC or the LRC based on only the duration of the MPDU, such that the accurate wireless environment may not be applied to the retransmission process.

The proposed problem provides a method of reflect the transmit time determined according to the wireless environment in protecting the channel in the wireless network and managing the frame retransmission.

The transmit time of the MPDU is determined according to a transmission rate. The transmission rate is determined according to the transmission conditions and the applied technologies of the MPDU or an MMPDU. The transmission conditions used to determine the transmission rate includes at least one of the transmission bandwidth, the number of spatial streams, and the MCS.

The STA determines which PPDU format is used to transmit the MPDU. The STA may use the link adaptation to determine the MCS. The transmitter receives the channel status from the receiver in the link adaptation. Therefore, the STA may adaptively determine the MCS based on the received channel status.

When the link adaptation is not supported, the STA may determine the MCS according to the retransmission frequency or the empirically obtained information. Alternatively, when the transmission bandwidth is dynamically changed, the STA may apply the MCS for the determined transmission bandwidth.

When the PPDU format is determined, the transmit time TXTIME may be defined as the following Equation:

$$TXTIME = PHY_{OVERHEAD} + \frac{PPDU_{DATA}}{R_{PHY}} \quad \text{[Equation 1]}$$

where $PHY_{OVERHEAD}$ is a value that is defined according to the duration of a preamble and/or a training symbol added to the PPDU, $PPDU_{data}$ is a value defined according to the duration of the transmitted data block (for example, MPDU or PSDU), and $R_{PHY}$ is a value defined according to the determined transmission rate.

In more detail, according to section 22.4.3 of IEEE P802.11ac/D1.0 "Amendment 5 Enhancements for Very High Throughput for Operation in Bands below 6 GHz" published in May, 2011, the transmit time of the VHT format PPDU is defined as the following Equation 2:

$$TXTIME = T_{L-STF} + T_{L-LTF} + T_{L-SIG} + T_{VHTSIG-A} + T_{VHT-PREAMBLE} + T_{VHTSIG-B} + T_{SYM} \times N_{SYM} \quad \text{[Equation 2]}$$

where $T_{L-STF}$, $T_{L-LTF}$, $T_{L-SIG}$, $T_{VHTSIG-A}$, $T_{VHT-PREAMBLE}$, and $T_{VHTSIG-B}$ represent the duration of L-STF, L-LTF, L-SIG, VHTSIG-A, VHT-PREAMBLE, and VHTSIG-B, $T_{SYM}$ represents a symbol interval, and $N_{SYM}$ represents the number of data symbols within the data field.

If it is determined that the transmit time is equal or larger than a transmit time threshold value ThresholdTxTime, the RTS/CTS frame exchange or CTS-to-self frame transmission is used.

In order to increase the success probability of the retransmitted MPUD, the MCS lower than the previously transmitted MCS may be applied according to the retransmission frequency.

Figure 6:
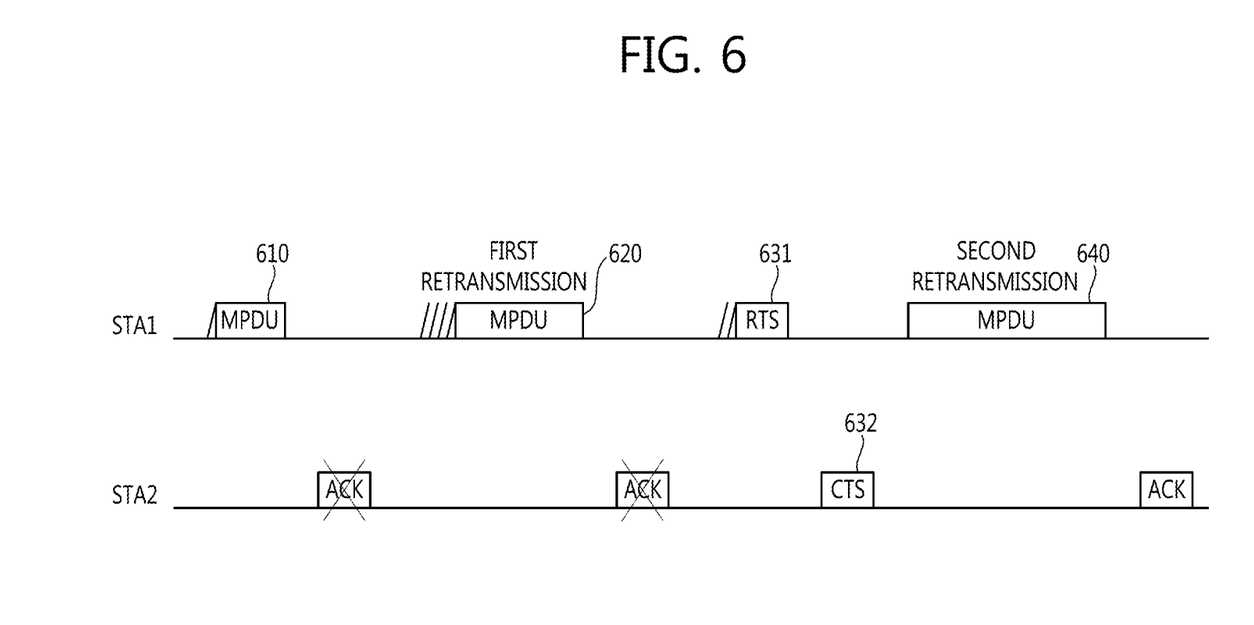
FIG. 6 is a diagram showing a method of transmitting a data block according to another exemplary embodiment of the present invention.

FIG. 6 shows a method of transmitting a data block according to another exemplary embodiment of the present invention.

The STA1 transmits the MPDU 610 to the STA2.

The STA1 that does not receive ACK from the STA2 transmits the retransmission MPDU 620 for the first retransmission. The retransmission MPDU 620 can use the MCS lower than that of the MPDU 610.

For the retransmission MPDU 620, the STA1 that does not receive ACK from the STA2 prepares the retransmission MPDU 640 for the second retransmission. The retransmission MPDU 640 can use the MCS lower than that of the MPDU 620 and it is assumed that the transmit time of the retransmission MPDU 640 becomes longer than the transmit time threshold value ThresholdTxTime. In this case, the STA1 does not immediately transmit the retransmission MPDU 640 but transmits an RTS frame 631 to the STA2 to confirm the channel status.

The STA1 receiving a CTS frame 632 from the STA2 transmits the retransmission MPDU 640 to the STA2.

Figure 7:
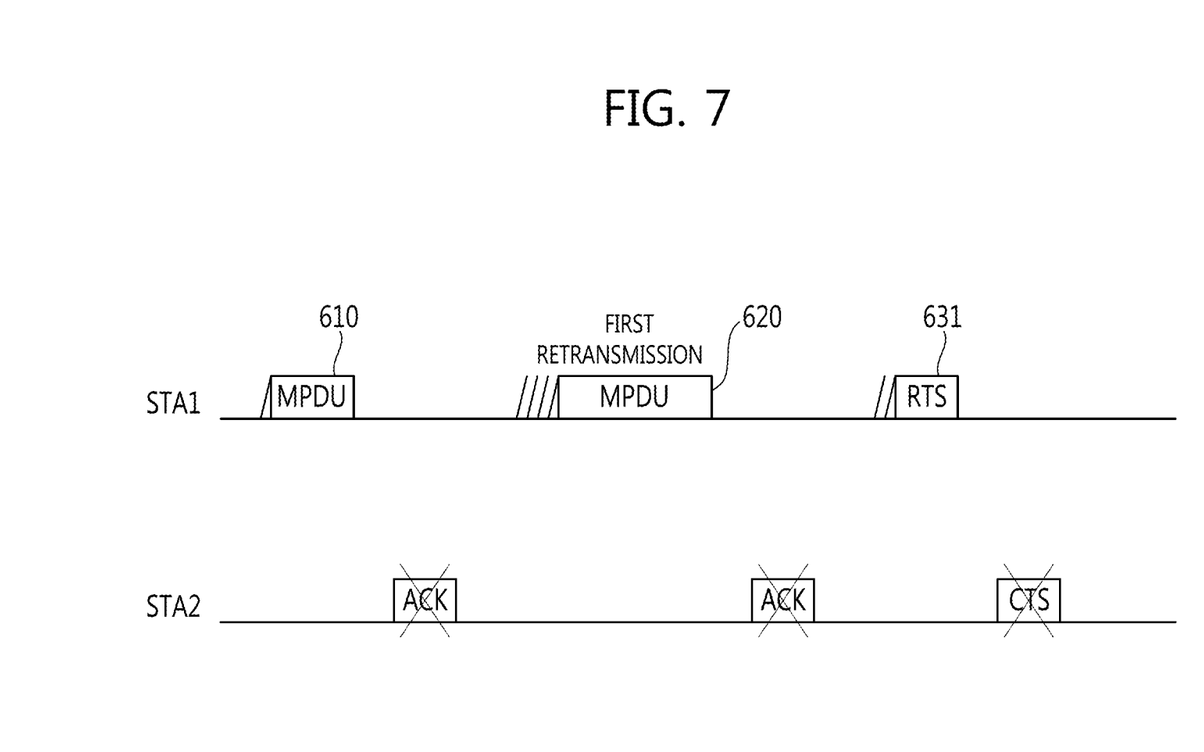
FIG. 7 is a diagram showing a method of transmitting a data block according to another exemplary embodiment of the present invention.

FIG. 7 shows a method of transmitting a data block according to another exemplary embodiment of the present invention.

Compared with the exemplary embodiment of FIG. 6, the STA1 transmits the RTS frame 631 and then, does not receive the CTS frame 632 from the STA2. Therefore, the STA1 does not perform the second retransmission.

The RTS/CTS frames are exchanged according to the transmit time of the retransmitted data block and when the channel collision is detected, the data block is not retransmitted. Therefore, the collision with other STAs is prevented and the unnecessary retransmission can be prevented.

Figure 8:
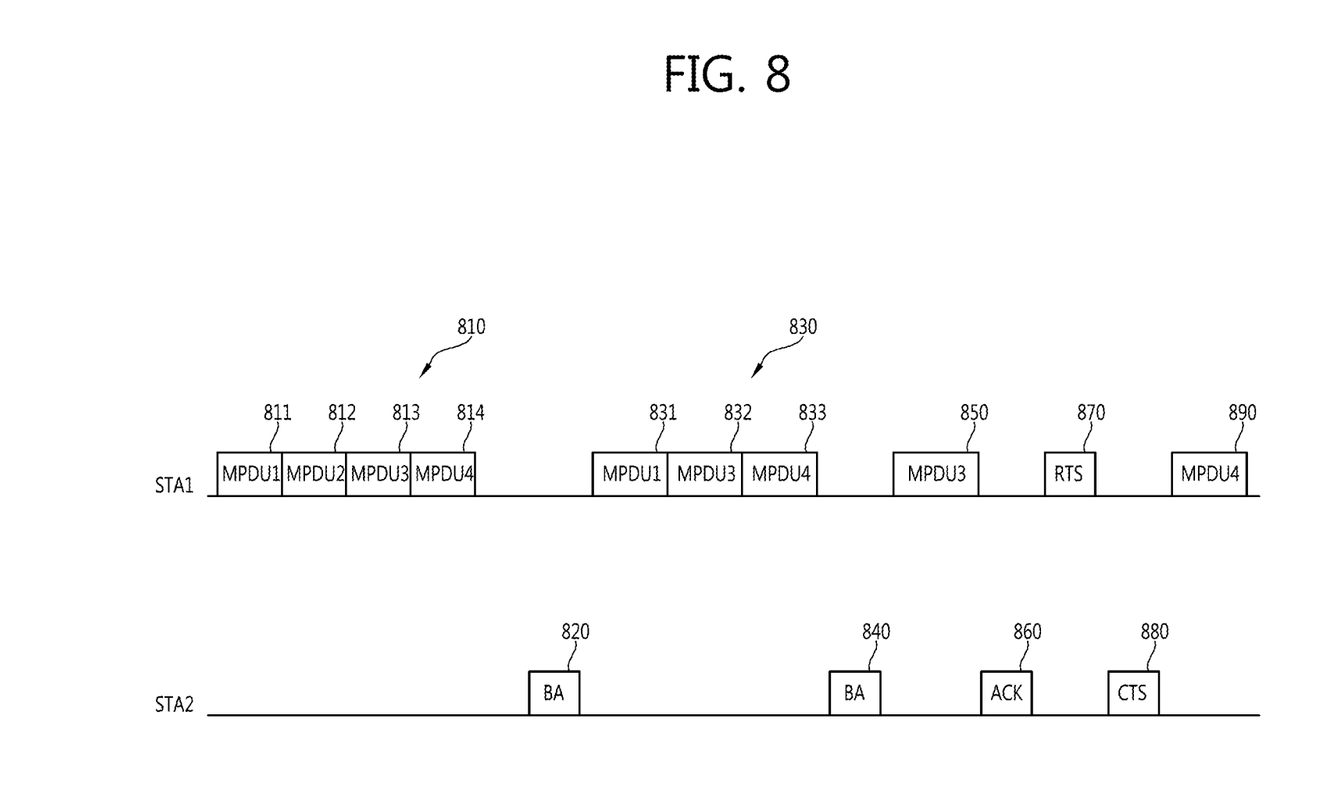
FIG. 8 is a diagram showing a method of transmitting a data block according to another exemplary embodiment of the present invention.

FIG. 8 shows a method of transmitting a data block according to another exemplary embodiment of the present invention. This is an example of using an aggregated MPDU including the plurality of MPDUs.

The STA1 transmits an A-MPDU 810 to the STA2. It is shown that the A-MPDU 810 includes an MPDU1 811, an MPUD2 812, an MPDU3 813, and an MPDU 814, but the number of MPDUs is not limited.

The STA2 transmits a block acknowledgement frame 820 as the receive acknowledgement for the A-MPDU 810.

The STA1 determining that the MPDU1 811, the MPUD2 812, the MPDU3 813, and the MPDU 814 fail to receive based on the BA frame 820 transmits the A-MPDU 830 for retransmission. The retransmission A-MPDU 830 includes MPDU1 831, MPUD3 833, and MPDU4 834. The MCS of the MPDU1 831, the MPDU3 833, and the MPDU4 834 included in the retransmission A-MPDU 830 may be lower than that of the MPDU1 811, the MPDU3 813, and the MPDU 814 included in the A-MPDU 810.

In retransmitting the A-MMPDU, the retransmission may be individually performed for each MPDU from the second retransmission.

The STA1 detects the receive failure of the MPDU3 813 and the MPDU4 814 based on the BA frame 840.

The STA1 transmits an MPDU3 850 as the second retransmission. Further, the STA1 receive ACK 860 for the MPDU3 850.

If it is determined that the transmit time of an MDPU4 890 is larger than the transmit time threshold value, the STA1 transmits the RTS frame 870 to the STA2 to confirm the channel status.

The STA1 receiving a CTS frame 880 from the STA2 transmits an MPDU4 890 to the STA2.

Comparing the transmit time of each of the retransmitted MPDU with the transmit time threshold value, the RTS/CTS exchange process starts when the transmit time is larger than the transmit time threshold value.

When the initial transmission fails and the transmit time is smaller than the transmission time threshold value, the RTS/CTS exchange is not performed and the SRC is increased by 1. In the retransmission, when the transmit time is larger than the transmit time threshold value, the RTS/CTS exchange is performed. When the retransmission fails, the LRC is increased by 1.

The related art increases the SRC or the LRC based on the byte length of the MPDU. However, the byte length does not correctly reflect the actual channel situation.

For example, if it is determined that the byte length of the MDPU3 is smaller than the RTSThreshold, only the SRC is managed and the retransmission needs to be performed as much as the SRL. However, according to the proposed method, the retransmission frequency for the MPDU3 is changed from the SRC to the LRC according to the used MCS. Therefore, even in the MPDU having the smaller byte length, the LRC is applied according to the increased duration of transmit time.

It is assumed that SRL=7 and LRL=3. The value of SRC is 6 and the value of LRC may be increased due to the lowered MCS. In this case, performing the retransmission until the value of LRC is equal to the LRC may more deteriorate the channel situations and therefore, a sum of the SRC and the LRC does not exceed the limit value.

Therefore, the case in which the retransmission for the MPDU becomes $CRC<C_{limit}$, $LRC<C_{limit}$, or $SRC+LRC<C_{limit}$. Here, the $C_{limit}$ is a given limit value. When the CRC, the LRC, or the SRC+LRC is equal to the $C_{limit}$, the retransmission is no further performed and the corresponding MPDU may be discarded.

The retransmission process of the MPDU or the retransmission process of the A-MPDU to which the above-mentioned proposed invention is applied will be described under the precondition that the number of bandwidths or spatial streams are not dynamically changed, which is by way of example only. The proposed invention can be applied to even the case in which the PHY data rate is changed by increasing or decreasing the bandwidths or increasing or decreasing the number of spatial streams.

Figure 9:
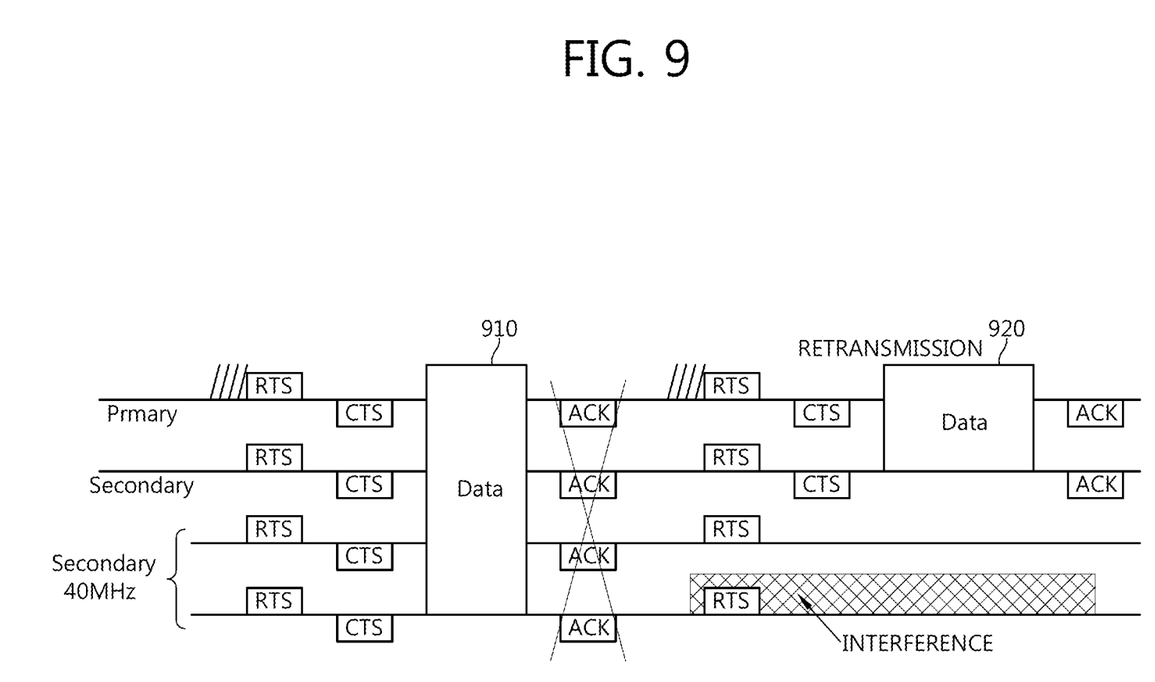
FIG. 9 is a diagram showing a method of transmitting a data block according to another exemplary embodiment of the present invention.

FIG. 9 is a diagram showing a method of transmitting a data block according to another exemplary embodiment of the present invention.

It is assumed that the bandwidth of 80 MHz is configured of a primary channel having a channel bandwidth of 20 MHz, a first secondary channel having a channel bandwidth of 20 MHz, and a second secondary channel having a channel bandwidth of 40 MHz. The number of sub-channels and the channel bandwidths are by way of example only.

When all the bandwidths of 80 MHz may be used due to the exchange of the RTS frame and the CTS frame, the transmitter transmits a data block 910 using the bandwidths of 80 MHz. However, it is assumed that the transmission fails and the retransmission is performed since the ACK frame does not receive from a receiver.

If it is determined that the transmission of the data block 910 fails, the transmitter may manage the retransmission counter based on the transmit time of the data block. The initial transmission is performed by using all of the bandwidths of 80 MHz and therefore, the transmit time of the data block 910 is smaller than the transmit time threshold value. The transmitter increases the value of SRC by 1 when the transmission of the data block 910 fails.

The bandwidth of a retransmission data block 920 is only 40 MHz and therefore, the transmit time of the retransmission data block 920 is larger than the transmit time threshold value. The transmitter increases the value of LRC by 1 when the transmission of the data block 920 fails.

The channel access may be attempted by reflecting the deteriorated channel status by managing the retransmission counter based on the transmit time of the data block.

The proposed invention may also be applied to the MU-MIMO. The transmitter transmits the A-MPDU for the MU-MIMO to the plurality of receivers. The MPDU (or A-MPDU) for the SU-MIMO or the MPDU (or A-MPDU) having the reduced spatial stream may be transmitted according to the execution of the retransmission. The channel of another user can be protected and the use of the deteriorated channel can be prevented, by using whether the RTS/CTS are exchanged with each other based on the transmit time of the MPDU. In addition, better channel can be selected and thus, the efficiency of the retransmission can be increased.

Channel access and a counter can be determined based on the transmit time of the data block or the frame. The present invention can be adapted to various wireless network environments and can reduce the waste of the unnecessary channel by using the transmission time dynamically changed in response to various situations as a reference.

Figure 10:
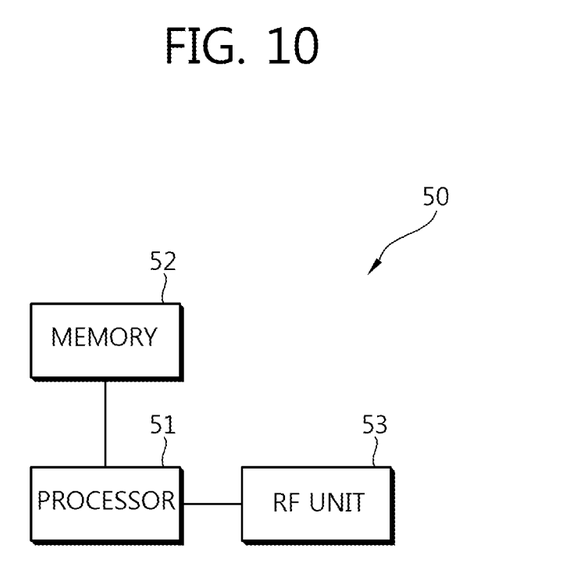
FIG. 10 is a block diagram showing wireless devices in which the exemplary embodiment of the present invention is implemented.

FIG. 10 is a block diagram showing wireless devices in which the exemplary embodiment of the present invention is implemented.

A wireless device 50 includes a processor 51, a memory 52, and a radio frequency (RF) unit 53. The processor 51 implements a function of the transmitter in the exemplary embodiment of FIGS. 6 and 9. The processor 51 can perform the transmission and retransmission of the frame and manage the retransmission counter. The memory 52 stores parameters for the operation of the processor 51. The RF unit 53 may transmit and receive the wireless signals.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting a data block in a wireless communication system, comprising:
   transmitting the data block to a receiver;
   determining whether the transmission of the data block fails;
   generating a retransmission block for the retransmission of the data block if it is determined that the transmission fails;
   increasing a value of a short retry counter (SRC) if it is determined that the transmission of the data block failed and a time to transmit the data block is less than a first threshold value;
   increasing a value of a long retry counter (LRC) if it is determined that the transmission of the data block failed and a time to transmit the data block is more than the first threshold value;
   determining whether channel access is performed according to a transmit time of the retransmission block;

performing the channel access if it is determined that the channel access is performed; and transmitting the retransmission block to the receiver after the channel access is performed.

2. The method of claim 1, wherein it is determined that the transmission of the data block fails, if it is determined that a receive acknowledgement for the data block is not received from the receiver.

3. The method of claim 1, wherein the performing of the channel access includes:

transmitting a request to send (RTS) frame to the receiver; and receiving a clear to send (CTS) frame from the receiver.

4. The method of claim 1, wherein the transmit time of the data block is determined according to a transmission rate.

5. The method of claim 4, wherein the transmission rate is determined based on at least one of a transmission bandwidth, a number of spatial streams, and a modulation and coding scheme (MCS).

6. The method of claim 1, further comprising:

determining to cease retransmission of the data block if a sum of the values of the LRC and the SRC exceeds a second threshold value.

7. A transmitter configured to transmit a data block in a wireless system, comprising:

an RF unit configured to transmit and receive a wireless signal; and a processor, operably connected to the RF unit, configured to:

instruct the RF unit to transmit the data block to a receiver;

determine whether the transmission of the data block fails;

generate a retransmission block for the retransmission of the data block if it is determined that the transmission fails;

increase a value of a short retry counter (SRC) if it is determined that the transmission of the data block failed and a time to transmit the data block is less than a first threshold value;

increase a value of a long retry counter (LRC) if it is determined that the transmission of the data block failed and a time to transmit the data block is more than the first threshold value;

determine whether channel access is performed according to a transmit time of the retransmission block;

perform the channel access if it is determined that the channel access is performed; and instruct the RF unit to transmit the retransmission block to the receiver after the channel access is performed.

8. The transmitter of claim 7, wherein the processor is configured to determine that the transmission of the data block fails, if it is determined that a receive acknowledgement for the data block is not received from the receiver.

9. The transmitter of claim 7, wherein the processor is configured to instruct the RF unit to transmit a request to send (RTS) frame to the receiver and receive a clear to send (CTS) frame from the receiver to perform the channel access.

10. The transmitter of claim 7, wherein the transmit time of the data block is determined according to a transmission rate.

11. The transmitter of claim 10, wherein the transmission rate is determined based on at least one of a transmission bandwidth, a number of spatial streams, and a modulation and coding scheme (MCS).

12. The transmitter of claim 7, wherein the processor is configured to cease retransmission of the data block if a sum of the values of the LRC and the SRC exceeds a second threshold value.

13. A method for transmitting a data block in a wireless communication system, comprising:

transmitting the data block to a receiver;

determining whether the transmission of the data block fails;

increasing a value of a short retry counter (SRC) if it is determined that the transmission of the data block failed and a time to transmit the data block is less than a first threshold value; and increasing a value of a long retry counter (LRC) if it is determined that the transmission of the data block failed and a time to transmit the data block is more than the first threshold value.

14. The method of claim 13 further including determining to cease retransmission of the data block if a sum of the values of the LRC and the SRC exceeds a second threshold value.

* * * * *